Figure 1:
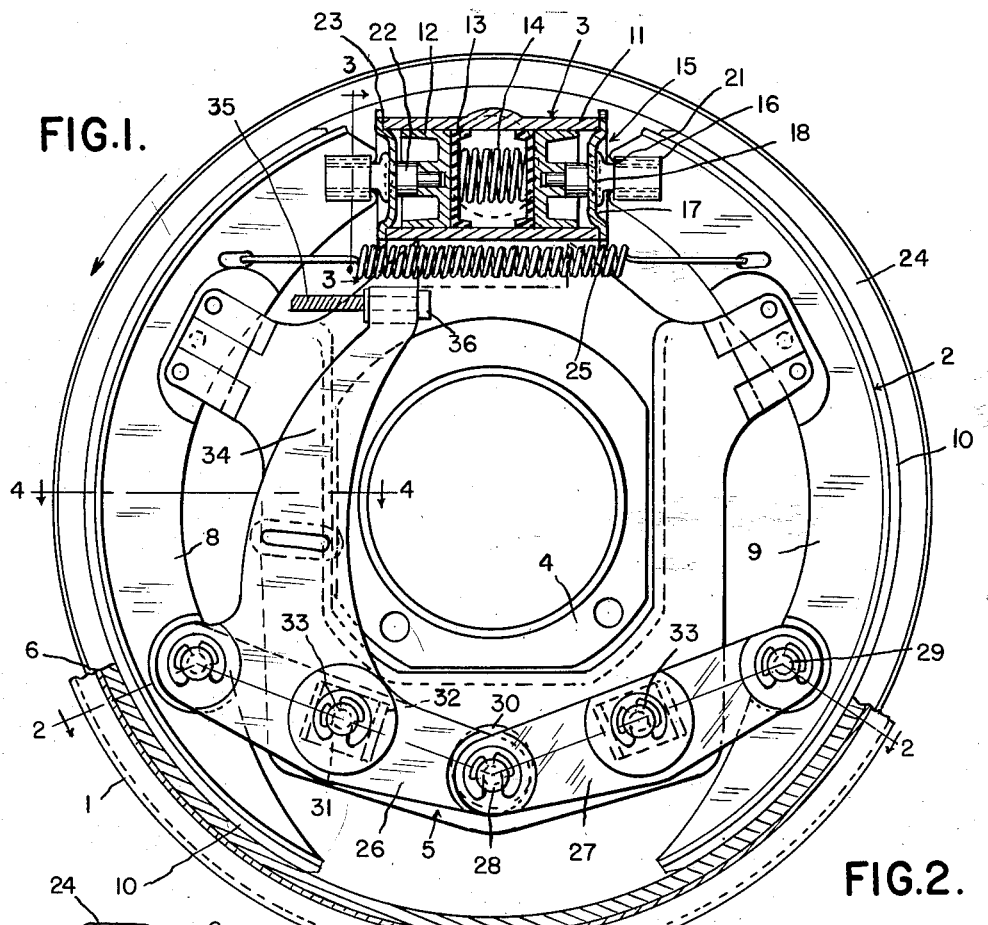

Dec. 11, 1951   E. R. ROSS   2,578,152
INTERNALLY EXPANDING BRAKE
Filed Aug. 18, 1947

INVENTOR.
ELMER R. ROSS
BY Whittemore Hulbert & Belknap.
ATTORNEYS

Patented Dec. 11, 1951

2,578,152

UNITED STATES PATENT OFFICE

2,578,152

INTERNALLY EXPANDING BRAKE

Elmer R. Ross, Detroit, Mich., assignor to Kelsey-Hayes Wheel Company, Detroit, Mich., a corporation of Delaware Application August 18, 1947, Serial No. 769,241

3 Claims. (Cl. 188—78)

The invention relates to brakes and refers more particularly to brakes of that type having a brake drum and a friction member engageable with the drum.

The invention has for one of its objects to provide an improved brake which is efficient in operation and in which the brake lining has substantially uniform wear.

The invention has for another object to provide a brake having the friction member formed of brake shoes and also having means for spreading apart adjacent ends of the shoes to initially apply the brake and other means for spreading apart the opposite ends of the shoes and transmitting circumferential thrust from one of the shoes to the other.

The invention has for further objects to so construct the brake that means at adjacent ends of the shoes takes a portion of the circumferential thrust of the shoes and means at the opposite ends of the shoes takes another portion of the circumferential thrust; to form the actuator between adjacent ends of the shoes with means for positioning a shoe when in its retracted position; to provide adjustable means between the actuator and an adjacent end of one shoe which is held in its various positions of adjustment by means of a spring for retracting the shoes; and to form the means between the ends of the shoes remote from the actuator with an arm which is operable to actuate the shoes independently of the operation of the actuator.

With these as well as other objects in view, the invention resides in the novel features of construction, combinations and arrangements of parts as more fully hereinafter set forth.

Figure 2:
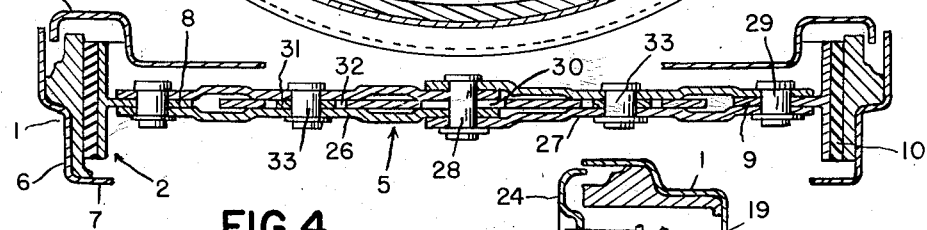
Figure 4:
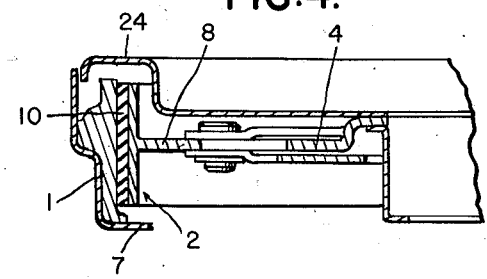
Figure 3:
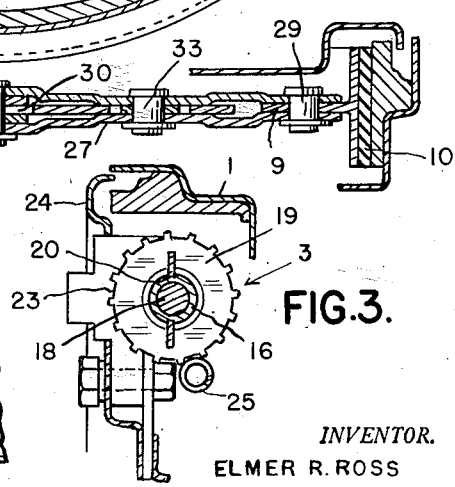

In the drawings:

Figure 1 is a side elevation partly broken away of a brake embodying the invention;

Figures 2, 3 and 4 are cross sections on the lines 2—2, 3—3 and 4—4 respectively of Figure 1.

In general, the brake comprises the brake drum 1, the friction member 2 engageable with the drum, the actuator 3 for moving the friction member into engagement with the drum to apply the brake, the anchor plate 4 and the device 5 remote from the actuator for moving the friction member into engagement with the drum.

The brake drum 1 has the annular brake flange 6 and the web 7, the latter being secured to the member to be braked, such as a motor vehicle wheel. The friction member 2 comprises the pair of brake shoes 8 and 9 within the drum, the brake shoes being preferably of T-shaped cross section and having the brake linings 10 for engaging the internal face of the brake flange 6.

The actuator, as shown, is a wheel cylinder mounted on the anchor plate 4 and located between the adjacent upper ends of the brake shoes 8 and 9. The wheel cylinder comprises the cylinder 11 fixedly secured to the anchor plate, the pistons 12 reciprocable within the cylinder, the sealing cups 13 and the coil spring 14 between and abutting the sealing cups for retaining the same against the heads of the pistons.

The pistons are operatively connected to the adjacent ends of the brake shoes 8 and 9 by means of the adjustable devices 15, each of which is formed of the nut 16 and the threaded member 17, the latter comprising the screw 18 threadedly engaging the nut and the disc 19 fixedly secured to the screw as by being welded to the head thereof. The nut 16 is sleeved into a slot in the web of the associated brake shoe and is provided with the diametrically opposite upper and lower slots 20 for receiving the edge portions of the web bordering the slot in the web. The nut is preferably permanently secured in place by peening over the ends of these edge portions against the outer end of the nut at 21. For the purpose of positioning the shoe end carrying the nut, the disc 19 is cupped to extend within and cooperate with the cylinder 11 to guide the shoe end into predetermined position relative to the cylinder when the shoe is in retracted position. 22 is a suitable abutment for the disc 19 carried by the head of the adjacent piston.

For the purpose of facilitating the rotation of the threaded member 17 to thereby adjust the adjacent ends of the brake shoes relative to the wheel cylinder, the discs 19 are formed with the peripheral notches 23 which are engageable by a suitable tool such as a screw driver insertable through openings formed in the cover plate 24. For holding the threaded members in their various positions of rotative adjustment the coil spring 25, extending between and connected to the upper end portions of the brake shoes 8 and 9 for retracting the brake shoes is located to engage the notches.

The device 5 comprises the pairs of levers 26 and 27 floatingly mounted on and guided by the lower portion of the anchor plate 4. The levers of each pair are at opposite sides of the anchor plate and the webs of the brake shoes 8 and 9 and the pairs of levers are operatively connected to each other and to the brake shoes near their ends remote from the actuator to spread apart the portions of the brake shoes at the zones of operative connection of the shoes and levers. More particularly, the pairs of levers are pivotally connected to each other at their adjacent overlapping ends by the pin 28 and are also pivotally connected to the brake shoes by the pins 29. The pin 28 extends freely through the opening 30 in the anchor plate, the opening being sufficiently large so that its edge at no time contacts the pin. The pairs of floating levers are floatingly mounted on and guided by the lower portion of the anchor plate 4 intermediate their ends by the slides 31 slidable in the openings 32 formed in the anchor plate. The pairs of levers are pivotally connected to the slides by the pins 33. The pins 29 for pivotally connecting the levers to the brake shoes are in zones between the pin 28 and the actuator 3 and the levers diverge with respect to each other in a direction toward the actuator from their pivotal connection to each other to their pivotal connections to the brake shoes so that upon the operation of the levers they spread apart the lower end portions of the shoes. The slots 32 slidably engaged by the slides 31 are preferably inclined so that their longitudinal median planes extend parallel to the planes connecting the pivots at the opposite ends of the levers. Also the levers are preferably alike and balanced. The structure is such that the levers and anchor plate take the major portion of the circumferential thrust of the shoes and the wheel cylinder takes the remaining and minor portion of the circumferential thrust.

The upper portion of the anchor plate to which the wheel cylinder is fixedly secured and the lower portion of the anchor plate which serves to floatingly mount and guide the levers are located in the median plane of the shoes to eliminate chatter or objectionable noise during operation of the brake.

For the purpose of applying the brake independently of the operation of the actuator one of the levers of the pair of levers 26 is provided with a transverse arm 34 extending toward the actuator 3 and terminating adjacent the retracting spring 25. The upper end portion of this arm is provided with an eye through which extends the cable 35 having at its end the abutment 36 engageable with the arm for swinging the same and thereby actuating the levers to spread apart the lower end portions of the brake shoes.

Assuming the brake drum 1 to be rotating in the direction of the arrow in Figure 1, it will be seen that when the braking liquid under pressure is forced into the wheel cylinder 3 the upper ends of the brake shoes 8 and 9 will be spread apart and moved into engagement with the brake flange 6 of the brake drum. The brake shoe 8 in moving circumferentially with the brake drum compels the levers 26 to swing in a counter-clockwise direction about their pivot pin 33. The inner ends of these levers 26 act through the pivot pin 28 upon the inner ends of the levers 27 thereby compelling the latter to swing in a clockwise direction about their pivot pin 33. This results in spreading apart the lower end portions of the brake shoes 8 and 9 and moving the lower or leading end portion of the brake shoe 9 into engagement with the brake flange 6. The levers 26 and 27 are floatingly guided during their swinging movement in applying the brake and transmit circumferential thrust of the brake shoe 8 to the brake shoe 9. A portion of this circumferential thrust (a minor portion of approximately 40% in the present instance) is taken through the adjustment device 15 by the cylinder 11, while the remaining portion (the major portion of approximately 60% in the present instance) is taken by the levers 26 and 27 in cooperation with the anchor plate 4. The proportion of the thrust taken by the cylinder and by the levers and anchor plate may be varied by varying the lengths of the arms of either lever, by varying the angle of divergence of the levers and also by varying the relative angle through the longitudinal median plane of the slots, the edges of which slidably engage the slides to which the levers are pivotally connected. Upon relieving the liquid pressure in the wheel cylinder the retracting spring 25 returns the brake shoe 8 and also the levers 26 and 27 and their associated parts to their normal or retracted positions.

In the event that it is desired to apply the brake independently of the operation of the wheel cylinder, this can be readily done by pulling upon the cable 35 which through the arm 34 swings the levers 26 and 27 to spread apart the lower end portions of the brake shoes into engagement with the brake flange of the brake drum.

What I claim as my invention is:

1. A brake comprising a brake drum, a pair of internal brake shoes engageable with said drum and having adjacent ends adapted to be spread apart and be individually anchored depending on the direction of rotation of said drum, levers pivotally connected at adjacent ends to each other and at opposite ends to said shoes near the opposite ends of said shoes, said levers diverging with respect to each other in a direction towards said adjacent ends of said shoes from their pivotal connection with each other to their pivotal connections with said shoes, a slide pivotally connected to each of said levers intermediate its ends and a guiding element for each of said slides, said guiding elements diverging with respect to each other in a direction toward said adjacent ends of said shoes.

2. A brake comprising a brake drum, a pair of internal brake shoes engageable with said drum and having separable ends adapted to be individually anchored depending on the direction of rotation of said drum, levers pivotally connected at adjacent ends to each other and at opposite ends to said shoes near the ends other than said separable ends, said levers diverging with respect to each other in a direction towards said separable ends from their pivotal connection to each other to their pivotal connections with said shoes, and a guiding element slidably supporting each of said levers intermediate the ends thereof, said guiding elements diverging with respect to each other in a direction towards said separable ends.

3. A brake comprising a brake drum, a pair of brake shoes, anchorage means at one side of said drum on which one shoe anchors when said drum is rotating in one direction and on which the other shoe anchors when said drum is rotating in the opposite direction, levers at the opposite side of said drum operatively connected to each other and said shoes and diverging with respect to each other in a direction toward said anchorage means and guiding elements slidably supporting said levers intermediate the ends thereof and diverging with respect to each other in a direction toward said anchorage means, said levers and guiding elements in either direction of rotation of said drum taking a portion of the thrust exerted by either shoe and transmitting another portion of the thrust to the other shoe.

ELMER R. ROSS.

REFERENCES CITED

The following references are of record in the file of this patent:

UNITED STATES PATENTS

| Number | Name | Date |
|---|---|---|
| 1,647,975 | Tuttle et al. | Nov. 1, 1927 |
| 1,789,448 | Parker et al. | Jan. 20, 1931 |
| 2,002,876 | Baisch et al. | May 28, 1935 |
| 2,009,106 | Chambers | July 23, 1935 |
| 2,024,808 | Sawtelle | Dec. 17, 1935 |
| 2,041,890 | White | May 26, 1936 |
| 2,057,847 | Sawtelle et al. | Oct. 20, 1936 |
| 2,140,379 | Carlson et al. | Dec. 13, 1938 |
| 2,188,453 | Bock | Jan. 30, 1940 |
| 2,311,788 | Swift | Feb. 23, 1943 |
| 2,396,387 | Rasmussen | Mar. 12, 1946 |
| 2,401,938 | Koch | June 11, 1946 |

FOREIGN PATENTS

| Number | Country | Date |
|---|---|---|
| 35,976 | France | Mar. 31, 1930 |
| | Addition to No. 627,476. | |
| 627,476 | France | June 11, 1927 |
| 785,248 | France | Mar. 5, 1937 |